(12) United States Patent
Zheng et al.

(10) Patent No.: US 7,231,264 B2
(45) Date of Patent: Jun. 12, 2007

(54) METHODS AND ARTICLES FOR DETECTING, VERIFYING, AND REPAIRING COLLINEARITY IN A MODEL OR SUBSETS OF A MODEL

(75) Inventors: Qinsheng Zheng, Sugar Land, TX (US); Magiel J. Harmse, Great Shelford (GB); Kent Rasmussen, Santa Barbara, CA (US); Blaine McIntyre, Cochrane (CA)

(73) Assignee: Aspen Technology, Inc., Cambridge, MA (US)

( * ) Notice: Subject to any disclaimer, the term of this patent is extended or adjusted under 35 U.S.C. 154(b) by 505 days.

(21) Appl. No.: 10/804,828

(22) Filed: Mar. 19, 2004

(65) Prior Publication Data

US 2004/0249481 A1 Dec. 9, 2004
US 2006/0015194 A9 Jan. 19, 2006
US 2007/0100477 A9 May 3, 2007

Related U.S. Application Data

(60) Provisional application No. 60/457,060, filed on Mar. 21, 2003.

(51) Int. Cl.
*G05B 13/02* (2006.01)
(52) U.S. Cl. .............................. 700/28; 700/29; 700/30; 700/31
(58) Field of Classification Search ................ 700/121, 700/28–30, 173, 186, 109–112, 117, 106, 700/119, 48, 95, 32
See application file for complete search history.

(56) References Cited

U.S. PATENT DOCUMENTS

| 3,934,124 | A | * | 1/1976 | Gabriel ........................ 700/45 |
| 5,347,446 | A | * | 9/1994 | Iino et al. ..................... 700/29 |
| 5,351,184 | A | | 9/1994 | Lu et al. |
| 5,394,322 | A | | 2/1995 | Hansen |
| 5,408,405 | A | * | 4/1995 | Mozumder et al. ........... 700/31 |
| 5,541,833 | A | * | 7/1996 | Bristol et al. ................. 700/45 |
| 6,026,334 | A | | 2/2000 | Kayihan et al. |
| 6,056,781 | A | * | 5/2000 | Wassick et al. ............... 703/12 |
| 6,373,033 | B1 | * | 4/2002 | de Waard et al. ........... 219/497 |
| 6,745,088 | B2 | * | 6/2004 | Gagne ........................ 700/29 |
| 2002/0016640 | A1 | | 2/2002 | Gagne |

FOREIGN PATENT DOCUMENTS

EP           0 524 317 A1    1/1993

* cited by examiner

*Primary Examiner*—Thomas K. Pham
(74) *Attorney, Agent, or Firm*—Hamilton, Brook, Smith & Reynolds, P.C.

(57) ABSTRACT

Systematic methods to detect, verify, and repair a collinear model are presented. After detecting collinearity in a model or subsets of a model, a directional test is carried out to verify if the collinearity is real. The model can then be adjusted in either direction to making a near collinear model exactly collinear or less collinear, subject to model uncertainty bounds or other linear constraints. When doing the model adjustment, deviations from the original model are minimized and the directionality of the model is kept unchanged.

32 Claims, 8 Drawing Sheets

METHODS AND ARTICLES FOR DETECTING, VERIFYING, AND REPAIRING COLLINEARITY IN A MODEL OR SUBSETS OF A MODEL

RELATED APPLICATION

This application claims the benefit of U.S. Provisional Application No. 60/457,060, filed on Mar. 21, 2003. The entire teachings of that application are incorporated herein by reference.

BACKGROUND OF THE INVENTION

Model Predictive Control (herein referred to as "MPC") is a technology utilized in various Advanced Process Control (herein referred to as "APC") systems. MPC-based systems have been implemented on thousands of refining and chemical processes over the past two decades. DMCplus®, and the earlier version, DMC, (both available from Aspen Technology, Inc. of Cambridge, Mass.) is a widely used MPC-based system. In an MPC-based system, a model is used to predict the future behavior of a process, given the current and history input information (e.g., measurements of process conditions). An optimized control plan is calculated such that the predicted future response and the control action needed to achieve the response will satisfy certain pre-defined criteria. Once the calculated control plan is implemented (e.g., after the first point of the control move is implemented), the process measurements are collected and fed back to the controller to update the model predictions. A new control plan calculation is then initiated.

In an MPC-based controller, the model plays a central role. The model not only dictates the accuracy of the predictions, but it also affects the control actions. Model uncertainty is inevitable in practice, so the quality of the model should be evaluated based on its relevant application (i.e., not just the model's predictive ability, but also its control performance).

Collinearity in the model impacts control performance significantly. Excessive control action is one problem associated with unsolved collinearity in a model. The action of the controller, at least to some extent, mirrors the response from the model universe. When the model is nearly collinear, but is not perfectly collinear, excess control action may be generated in response to changes in system constraints or to achieve insignificant objective function improvements. A second problem associated with unsolved collinearity is that of unstable closed-loop control. If both the model and the underneath process are nearly collinear, but they have different directionality, the closed-loop system will become unstable. A third problem associated with unsolved collinearity is poor process performance. If the underlying process being modeled is not collinear, but the model is, then the controller will treat the process as if it has fewer degrees of freedom in the controlled variables and will not explore the full potential of the process. Poor control performance can even cause damage to the normal operation of the process.

Numerous attempts have been made to alleviate the problems posed by collinearity to MPC implementations. For example, some tools developed by the APC community detect a collinear model, or model subsets, through the use of either Relative Gain Array (herein referred to as RGA) or Singular Value Decomposition (herein referred to as SVD) to detect a collinear model or model subsets. See, for example, J. M. Maciejowski's "Multivariable Feedback Design," published by Addison-Wesley Publishing Company, 1990, ISBN 0-201-18243-2, the entire teachings of which, are incorporated herein by reference. Some of those tools also adjust the model to minimize the RGA number; however, those approaches are limited to a 2×2 system.

A need exists for methods and articles for systematically detecting, verifying, and repairing collinear models.

SUMMARY OF THE INVENTION

This invention provides systematic methods to detect, verify, and repair the collinearity of a model or its subsets (also referred to as "sub-matrices"), such as models used for MPC-based control.

In one embodiment of the invention, a method first uses SVD to search over a given model matrix and identify all nearly collinear model subsets based on give condition number thresholds. Then the method estimates the control action aggressiveness or magnitude should the model be used for MPC-based control.

The method recommends a directional plant test to excite the process in its weak direction. After the directional plant test, a new model identification is conducted on the transformed space spanned by singular vectors. The transformed identification result is used to verify if the underneath process is truly collinear. If the verification concludes that the process, or a part of the process, is nearly collinear, then a "Collinerization" procedure is implemented. If the verification indicates that the process is not close to collinearity, then an "Uncollinearization" procedure is implemented.

In Collinearization, the smallest singular values of each selected subset of the model are set to exactly zeros while keeping the directionality unchanged (i.e., same singular vectors). If more than one solution is available, the one which is closest to the original model is selected and the deviation is minimized. In Uncollinearization, the condition numbers of each selected subset of the model are maximized through the adjustment of the model while keeping the directionality unchanged. In either case, the model is adjusted subject to the given constraints (e.g., model uncertainty bounds or any linear equations).

In some embodiments, this invention includes a systematic methodology to detect, verify, and repair collinearity or near collinearity in a model used for Model Predictive Control purposes.

In further embodiments, this invention includes a method of detecting, verifying, and repairing collinearity or near collinearity in a model. In one example, the method comprising the steps of defining bounds for a gain matrix, specifying a collinear threshold, examining the matrix to identify all near-collinear sub-matrices, scaling at least one weak output for each near-collinear sub-matrix, adjusting a control action magnitude, determining what type of model repair would be desirable, constructing a quadratic programming problem, and solving the quadratic programming problem to generate a new model matrix.

In yet another embodiment, this invention includes the use of an optimization formula, to make a selected sub-model perfectly collinear while the same directionality is maintained and the model deviation is minimized.

In still more embodiments, this invention includes the use of an optimization formula, to make a selected sub-model less collinear while the same directionality is maintained and the model deviation is minimized.

In some embodiments, this invention includes a computer program product, comprising a computer usable medium, and a set of computer program instructions embodied on the computer useable medium for detecting, verifying, and repairing collinearity or near collinearity in a model used for Model Predictive Control purposes.

In other embodiments, this invention includes a computer system to detect, verify, and repair collinearity or near collinearity in a model used for Model Predictive Control purposes. In one example, the computer system comprises a data transfer means for transferring data among components of a computer, a digital processor coupled to receive input from the data transfer means, and an output means coupled to the digital processor. The digital processor executes a method for analyzing a model used for Model Predictive Control purposes. The model detects collinearity or near collinearity in the model, verifies the collinearity or near collinearity in the model, and repairs the collinearity or near collinearity in the model. The output means provides to a user the analyzed model.

In still more embodiments, this invention features a chemical species manufactured by a process that includes a modeling method, wherein the modeling method is analyzed to detect, verify, and repair collinearity or near collinearity.

The methods of this invention can be applied simultaneously to more than one model subset, which is advantageous when dealing with multiple model subsets that share common elements. There is no limitation on the size of the collinear models or collinear subsets (at least 2×2, 3×3, 4×4, 5×5, 6×6, or more than 6×6). Both collinearization and uncollinearization are posed as a Quadratic Programming (QP) problem, and hence have unique solutions and can be solved efficiently. Additionally, this invention allows the imposition of constraints model gain(s) while the changes in the gain(s) is minimized. For example, some constrains that can be imposed are high and/or low bounds, material and/or energy balances, and the like.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
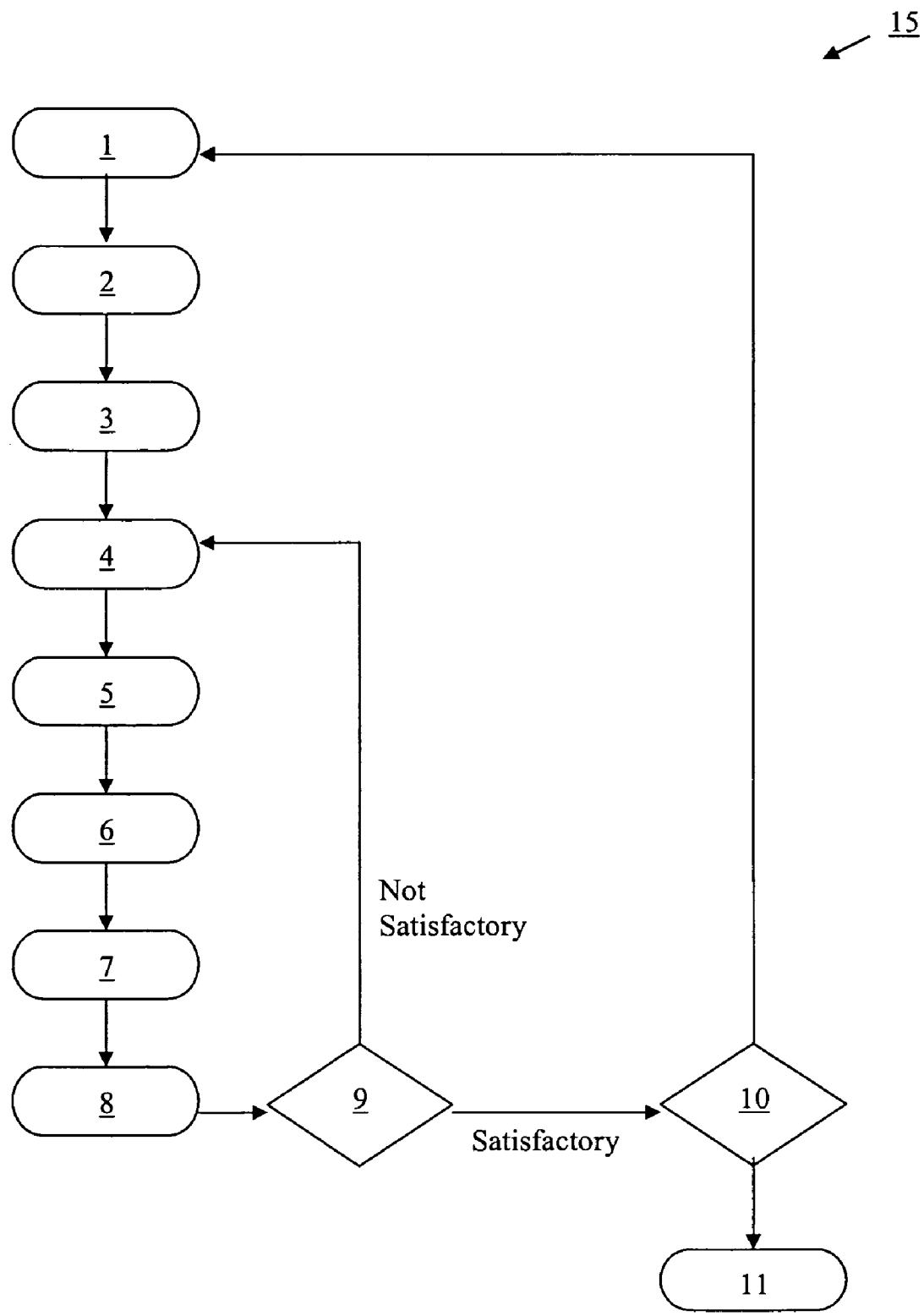
FIG. 1 is a flow diagram of a process embodying the present invention method.

A description of preferred embodiments of the invention follows. While this invention has been particularly shown and described with references to preferred embodiments thereof, it will be understood by those skilled in the art that various changes in form and details may be made therein without departing from the scope of the invention encompassed by the appended claims.

In order to describe the methods and articles of this invention in detail, an exemplar system will first be defined. It will be apparent to those of skill in the art that these definitions are for illustrative purposes only and that this invention includes additional methods not illustrated herein. It will also be apparent to those of skill in the art that this invention is applicable to systems and models that are not illustrated and/or do not comport with the definitions listed herein.

Definitions

Consider a model (G) which relates manipulated variables (MV) to controlled variables (CV), such that CV=G*MV or:

$$\begin{bmatrix} cv_1 \\ \vdots \\ cv_n \end{bmatrix} = \begin{bmatrix} g_{11} & \cdots & g_{1m} \\ \vdots & \vdots & \vdots \\ g_{n1} & \cdots & g_{nm} \end{bmatrix} * \begin{bmatrix} mv_1 \\ \vdots \\ mv_m \end{bmatrix} \quad \text{Equation 1}$$

The model G can be, for example, the steady-state gain matrix or the frequency domain transfer functions. In the later case, the we consider the collinearity issue for a given frequency.

Assume $n \geq m$ and that the matrix G has the following singular values from SVD calculations:

$\sigma_1, \sigma_2, \ldots, \sigma_m$ where $\sigma_1 >= \sigma_2 >= \ldots >= \sigma_m >= 0$.

The original gain matrix can then be represented by Equation 2:

$$G = U * \text{Diag}(\sigma_i) * V' \quad \text{Equation 2}$$

Here, $U_{n \times m}$ and $V_{m \times m}$ are both unitary matrices, and $U_i$ and $V_i$ represent the $i^{th}$ column of U and V, respectively. From the property of SVD, we have the following relationships (collectively referred to herein as "Equation 3"):

$$\sigma_1 = \max_{MV \neq 0} \frac{\|CV\|_2}{\|MV\|_2} \text{ and } \sigma_m = \min_{MV \neq 0} \frac{\|CV\|_2}{\|MV\|_2}.$$

The maximum is achieved when MV moves along the direction defined by $V_1$ (herein referred to as "the strong direction"), and the minimum is achieved when MV moves along the direction defined by $V_m$ (herein referred to as "the weak direction").

From Equation 2, each element in G can be expressed by Equation 4:

$$g_{ij} = \sum_{k=1}^{m} \sigma_k * u_{ik} * v_{jk} \quad \text{Equation 4}$$

For a square system (i.e., where n=m), the relationship defined by Equation 2 can be reversed as shown in Equation 5:

$$\text{Diag}(\sigma_i) = U' * G * V \quad \text{Equation 5}$$

Given the threshold s>0, a model matrix has a rank of r(s) if:

$\sigma_r/\sigma_1 >= s$ and $\sigma_{r+1}/\sigma_1 < s$.

$r(s) \geq 0$ and $r(s) \leq m$. If $r(s) = m$, then the given system has a full rank and the matrix is not "collinear." If $r(s) < m$ and $\sigma_m = 0$, the system is "collinear" or "perfectly collinear." If $r(s) < m$ and $\sigma_m = 0$, then the system is "nearly collinear."

A transformed input vector MT and a transformed output vector CT as follows:

$$MT = V'^* MV \qquad \text{Equation 6}$$

$$CT = U'^* CV \qquad \text{Equation 6.1}$$

Then the transformed input and output variables have the following relationship:

$$ct_i = \sigma_i * mt_i, \; i = 1, \ldots, m \qquad \text{Equation 7}$$

$G(sm)$ is a square sub-matrix derived from $G$, where $sm = 1, \ldots, p$ and $p$ is the number of all possible square sub-matrices. The dimension of $G(sm)$ ranges from $2 \times 2$, $3 \times 3, \ldots$, to $m \times m$. When dealing with collinearity, the focus can be placed on square sub-matrices because if a $n \times m$ matrix is collinear (where $n > m$), then all its $m \times m$ sub-matrices must be collinear too.

Collinearity Detection

For a given model matrix $G$, and a given threshold $s$, a search over all sub-matrices $G(sm)$, where $sm = 1, \ldots, p$, is conducted and the sub-matrices are sorted into three groups: 1) a not collinear group, $G_n(sm)$; 2) a nearly collinear group, $G_{nc}(sm)$; and, 3) a collinear group, $G_c(sm)$.

If the $G_{nc}(sm)$ group is empty, the method can be stopped. Alternatively, the threshold value can be modified and the method of the invention begun again. If the $G_{nc}(sm)$ group is not empty, the collinearity of the sub-matrixes in that group is verified.

Collinearity Verification

When a sub-matrix falls into the nearly collinear group, the available degree of freedom is then either recognized or ignored even though the extra capability may be limited. In order to determine the best course of action for a given application, the collinearity can be verified. This verification includes determining whether the control action is acceptably aggressive for the needs of the given application, and controlling as described below:

Control Action Magnitude

When a system is nearly collinear, the associated control action for certain CV targets will be aggressive, since the control action is, to some extent, proportional to the response of the model inverse. The most significant magnitude (in the sense of 2-norm) of MV change happens when the CV move along the weak direction, that is, $$CV = \alpha * U_m, \; \alpha \in R \qquad \text{Equation 8}$$

$$MV = (\alpha / \sigma_m) * V_m \qquad \text{Equation 9}$$

$\alpha$ can be used as a scaling number so that the CV change will be in a desired range, and then the required MV change can be estimated from Equation 9. Based on the knowledge of the process, a practitioner can make a judgment if the control action required to achieve the targets is reasonable. If it is determined that the control action is desirable, then the near collinearity is acceptable and no model adjustment is necessary. If it is determined that the action is not desirable, a directional test and identification is performed.

Directional Test and Identification

As shown in Equation 7, for a nearly collinear process, the transformed outputs $ct_i$, $i = r+1, \ldots, m$ will have a relatively small response to the transformed inputs $mt_i$, $i = r+1, \ldots, m$. Moreover, their corresponding singular value $\sigma_i$ is similar to the gain between the transformed input and the transformed output. This relationship provides an opportunity to verify if the real process is the case, by employing the following procedure:

1. Perturb the system in such a way that the input signals follow the direction specified by $U_i$, $i = r+1, \ldots, m$.
2. Construct transformed input and outputs vectors $mt_i$ and $ct_i$, $i = r+1, \ldots, m$ using the collected test data.
3. Identify model between $mt_i$ and $ct_i$, $i = r+1, \ldots, m$.
4. If the identified gain in the transformed space is close to $\sigma_i$ and the uncertainty bound of the identified gain surrounds 0, then this portion of the process is deemed to be truly collinear; otherwise, it is deemed to be not collinear.
5. The newly collected test data is used to improve the model quality by rerunning the identification because the newly collected data contains rich process responses in the weak direction.
6. Repeat the collinearity detection with the improved model.
7. The iteration of this procedure should be terminated based on the convergence situation and the desires of the practitioner.

When conducting the directional test, all inputs are perturbed simultaneously with their direction and magnitude defined by the singular vector. As such, the inputs are highly correlated. Therefore, the identification is done either on the transformed space or the new data after it has been merged with the existing data.

One benefit from doing the test and identification in the transformed space is that a less conservative uncertainty bound can be estimated. Normally, each model curve has its own uncertainty bound and is independent from each other or univariate. This kind of uncertainty bound can be overly conservative. With the identification in the transformed space (since the singular vectors are unitary, their role is very similar to using latent variables), we are able to get an uncertainty described by a linear inequality (multivariate). This may result in a less conservative uncertainty description.

The relationship between the transformed variable and the original variables is as follows. Assume $$ct = \sum_{j=1}^{n} a_j \cdot cv_j \text{ and } mt = \sum_{i=1}^{m} b_i * mv_i.$$

A gain k is identified for (mt,ct). That is, $$\sum_{j=1}^{n} a_j \cdot cv_j = k * \sum_{i=1}^{m} b_i * mv_i$$

In the original space, the inputs and outputs satisfy the following equation:

$$cv_j = \sum_{i=1}^{m} g_{ji} * mv_i$$

Combining the above two equations, we have $$\sum_{i=1}^{m}\left(\sum_{j=1}^{n}a_j*g_{ji}-k*b_i\right)*mv_i=0 \quad \quad 5$$

Each $mv_i$ is independent, and:

$$\sum_{j=1}^{n}a_j*g_{ji}=k*b_i, \quad i=1,\ldots,m \quad \text{Equation 10}$$

or $$\left(\sum_{j=1}^{n}a_j*g_{ji}\right)/b_i=k, \quad i=1,\ldots,m$$

Knowing the uncertainty bound on k allows the translation of this bound into a constraint on the original gain matrix (a linear inequality) with the use of Equation 10. This additional constraint can contribute to a less conservative uncertainty description and can be incorporated into the Collinearization and Uncollinearization procedures, as discussed subsequent.

Collinearization

If the process is deemed nearly collinear, then it can be desirable to make the corresponding model to be perfectly collinear. In another word, a practitioner can reduce the degree of freedom shown in the model matrix so that the controller will behave safer or in a more desirable manner. To accomplish this, the smallest singular value can be zeroed out using one of two approaches.

Direct Approach

Using Equation 4 can force $\sigma_{r+i}=0, i=1,\ldots m-r$ and then a new model K can be recalculated from $$k_{ij}=\sum_{k=1}^{r}\sigma_k*u_{ik}*v_{jk}$$

Since the dropped singular values are relatively small, the new model K will be similar to the original model G.

Optimization Based Approach

In some applications, the direct approach may not be appropriate. For example, if the original elements $g_{ij}$ are very close to 0, the direct approach can results in an adjusted model $k_{ij}$ having the opposite sign as the original model. In some applications, such a change in sign value can make it difficult to determine if the new model can be used safely. In another example, a collinear sub-matrix may share common elements with another collinear sub-matrix in matrices that are larger than 2×2, so that when one sub-matrix is adjusted, the adjustment adversely affects the other sub-matrix.

Furthermore, if the sub-matrices are repaired one by one, it can result in a never ending loop with the repairs to one sub-matrix giving rise to a need for more repairs to the other sub-matrix. In addition, changes in the directionality of the model can adversely affect the controller more than the original collinearity.

Also, it can be desirable to impose constraints on how the model can be adjusted. For instance, a gain should not flip its sign and it should stay within its uncertainty bound, etc.

To address these concerns, the following optimization formula is created:

$$\text{Minimize} \sum_{i=1}^{n}\sum_{j=1}^{m}(g_{ij}-g_{ij(0)})^2 \quad \text{Equation 10}$$

subject to:

$$g_{ij}^{-}=<g_{ij}<=g_{ij}^{+}, i=1,\ldots,n, j=1,\ldots,m \quad \text{Constraint 10.1}$$

$$\sigma_{ij}^{-}(sm)=< \quad \text{Constraint 10.2}$$

$$\sum_{k=1}^{m(sm)}\sum_{l=1}^{m(sm)}g_{lk}(sm)*u_{li}(sm)*v_{kj}(sm)<=\sigma_{ij}^{+}(sm)$$

$$i,j=1,\ldots,m(sm), sm=1,\ldots,p$$

G(0) represents the nominal model, $G^{+}$ and $G^{-}$ represent the allowed upper and lower bound of the model. $\sigma_{ij}^{-}$ and $\sigma_{ij}^{+}$ are allowed upper and lower bound for the singular values. m(sm) is the dimension of the sub-matrix sm. p is the total number of nearly collinear sub-matrices $G_{nc}(sm)$.

Equation 10 is the objective function. The objective function minimizes deviation from the nominal model as long as the required perfect collinearlity can be achieved. Constraint 10.1 represents the allowed variation for each model element. Constraint 10.2 is contributed from each nearly collinear sub-matrix. All $u_{li}(sm)$ and $v_{li}(sm)$ are the singular vectors calculated from the original sub-matrix $G_{nc}(sm)$, and hence the same directionality is always maintained.

In some embodiments, $\sigma_{ij}^{-}$ and $\sigma_{ij}^{+}$ are set to

1) $\sigma_{ij}^{-}(sm)=\sigma_{ij}^{+}(sm)=0$ if $i \neq j$, which corresponds to the off-diagonal portion of the singular value matrix;
2) $\sigma_{ii}^{-}(sm)=\sigma_{ii}^{+}(sm)=0$ if $i>r(sm)$, which corresponds to those small singular values to be zeroed out;
3) $\sigma_{ii}^{-}(sm)=\sigma_{i}(0)*(1-eps)$ and $\sigma_{ii}^{+}(sm)=\sigma_{i}(0)*(1+eps)$ if $i <=r(sm)$, where $0<eps<1$ is a constant. Choosing a large value for eps allows large variations in the singular values. Since the objective function always tries to find the minimal variation for the model matrix, it is expected that variation of the singular value will also be very mild. Hence, a small eps (for instance, eps=0.1) can be safely used.

Finally, Equation 10 is a standard QP formula and can be solved globally and efficiently.

Uncollinearization

If the process is not collinear, or is nearly collinear but needs the controller to fully explore its capability, then adjustments to the model can be made to improve the condition number so that an improved robustness can be achieved.

Uncollinearization should satisfy the following requirements:

1. The repaired model should have the same directionality as the original model because changing the direction can cause unwanted control problems that can potentially result in a less desirable performance than with the original collinearity.
2. The directionality change should be made within allowed ranges. Additional restrictions can also be imposed, such as additional linear equality or inequality constraints.

3. When treating a model matrix larger than 2×2, a collinear sub-matrix can share common elements with another collinear sub-matrix. Such a case can result in a "zigzag game" or never ending loop, with repairs to one sub-matrix giving rise to a need for repairs to the other sub-matrix. Hence, the methodology should be able to deal with multiple sub-matrices in a synchronized way.

To achieve these goals, the following optimization formula was created:

$$\text{Maximize} \sum_{sm=1}^{p} \sum_{i=1}^{m(sm)-r(sm)} (\sigma_{r(sm)+i} / \sigma_{r(sm)+i}(0))^2 \quad \text{Equation 11}$$

subject to:

$$g_{ij}^+(sm) = \ < \sum_{k=1}^{m(sm)} \sigma_k(sm) * u_{ik}(sm) * v_{jk}(sm) <= g_{ij}^-(sm), \quad \text{Constraint 11.1}$$

$$i, j = 1, \ldots, m(ms)$$

$$\sigma_i^-(sm) = \ < \sigma_i(sm) <= \sigma_i^+(sm), i = 1, \ldots, m(sm) \quad \text{Constraint 11.2}$$

$$\sum_{k=1}^{m(q)} \sigma_k(q) * u_{ik}(q) * v_{jk}(q) = \sum_{k=1}^{m(t)} \sigma_k(t) * u_{ik}(t) * v_{jk}(t), \quad \text{Constraint 11.3}$$

for those i,j which point to the same element in G, sm, q, t=1, . . . , p, q≠t.

$g_{ij}^+$ and $g_{ij}^-$ denote the upper and lower bounds of the allowed model adjustment, $\sigma_i^-$ and $\sigma_i^+$ are upper and lower bounds on the singular values, $\sigma_{r+i}(0)$ represents the original singular value, and m(sm) is the dimension of the sub-matrix sm. p is the total number of nearly collinear sub-matrices $G_{nc}(sm)$. Additional explanation of Equation 11 is provided below.

The objective function is to maximize the portion of the smaller singular values of all nearly collinear sub-matrices. The weighting factor, $1/\sigma_{r(sm)+i}(0)$, means the smaller the original singular value, the more improvement the optimizer will attempt to obtain. Constraint 11.1 represents the allowed variation for each model element. All $u_{ik}(sm)$ and $v_{jk}(sm)$ (as well as $u_{ik}(q)$, $v_{jk}(q)$, $u_{ik}(t)$, and $v_{jk}(t)$) are the singular vectors calculated from the original sub-matrix $G_{nc}(sm)$ (or $G_{nc}(q)$, $G_{nc}(t)$), and hence the same directionality is always maintained. Constraint 11.2 is the allowed singular value variation range, which is discussed further below.

Constraint 11.3 is needed if there are two sub-matrices who share the same element in the original model matrix. In this case, any adjustment made for one sub-matrix will automatically be coordinated with another associated sub-matrix, and hence remove the "zigzag problem."

The final goal is to maximize the condition number. Equation 11 does not explicitly employ a condition number because directly optimizing a condition number will pose a computation problem so difficult as to be unrealistic. As such, an approximation is made by maximizing the portion of the smaller singular values, while keeping the other singular values from dropping too low. For this purpose, the bounds for each singular value should be set as follows:

1. For $\sigma_i<$, i=1, . . . , r, the singular values are only allowed to decrease, but not below $\sigma_{r+1}(0)$.
2. For $\sigma_i<$, i=r+1, . . . , m, the singular values are only allowed to increase, but not above $\sigma_r(0)$.

That is:

$\sigma_i^- = \sigma_{r+1}(0)$, i=1, . . . , r $\sigma_i^+ = \sigma_i(0)$, i=1, . . . , r $\sigma_i^- = \sigma_i(0)$, i=r+1, . . . , m $\sigma_i^+ = \sigma_r(0)$, i=r+1, . . . , m Equation 11 is a standard QP formula, and hence, can be solved globally and efficiently.

FIG. 1 illustrates a flow diagram of Process 15, embodying a method of the present invention. A model gain matrix is imported at Step 1. For example, the model gain matrix can be imported from a MPC-based system, such as a system running a computer based control software (e.g., one for use in the chemical, petrochemical, pharmaceutical, petroleum, electric power, food, consumer products, metals, or mineral industries). Examples of such software include DMCplus® (available from Aspen Technology, Inc. of Cambridge, Mass.) or RMPCT (available from Honeywell, Inc., of Morris Township, N.J.). For example, in a DMCplus® application, this step can include loading a MDL file. Any feed-forward variables should be excluded.

At Step 2, the upper and lower bounds for the gain matrix are defined. For example, this can be the previously discussed uncertainty bounds or the percentage of gain variation allowed. Then a collinear threshold is specified at Step 3.

At Step 4, the matrix is examined to identify all near-collinear sub-matrices. In some embodiments, this is accomplished with the use of Equation 5. Before any SVD calculation is carried out, a sub-matrix can be scaled so that the scaled sub-matrix has a condition number close to its optimal value.

Step 5 includes presenting the following results to the user:
all near-collinear sub-matrices,
their singular values,
weak inputs and outputs, and
control action magnitude.

Step 6 includes providing a scaling factor for each near-collinear sub-matrix so that the user can scale the weak outputs to a more meaningful or desired range. The control action magnitude is then automatically adjusted accordingly. In some embodiments, this is accomplished with the use of Equation 8.

At Step 7, the practitioner specifies what kind of model repair should be taken (e.g., Collinearization or Uncollinearizaton), and then selects which sub-matrix will participate in the repairs.

Then at Step 8, the optimization program constructs a QP problem based on the inputs (e.g., submatrices that are to be repaired) and runs a QP solver to produce a new model gain matrix. In some embodiments, this is accomplished with the use of Equations 10 and/or 11.

At Step 9, the results are evaluated and if the results are not satisfactory, Process 15 is repeated, starting at Step 4, with the newly generated model matrix. This loop is repeated until satisfactory results are obtained.

With satisfactory results, the threshold or uncertainty bounds are modified at Step 10, and the method is started again. Once the nearly collinear submatrices are repaired to the extent desired, then a practitioner proceeds to Step 11, which includes exporting the new model matrix.

Figure 2:
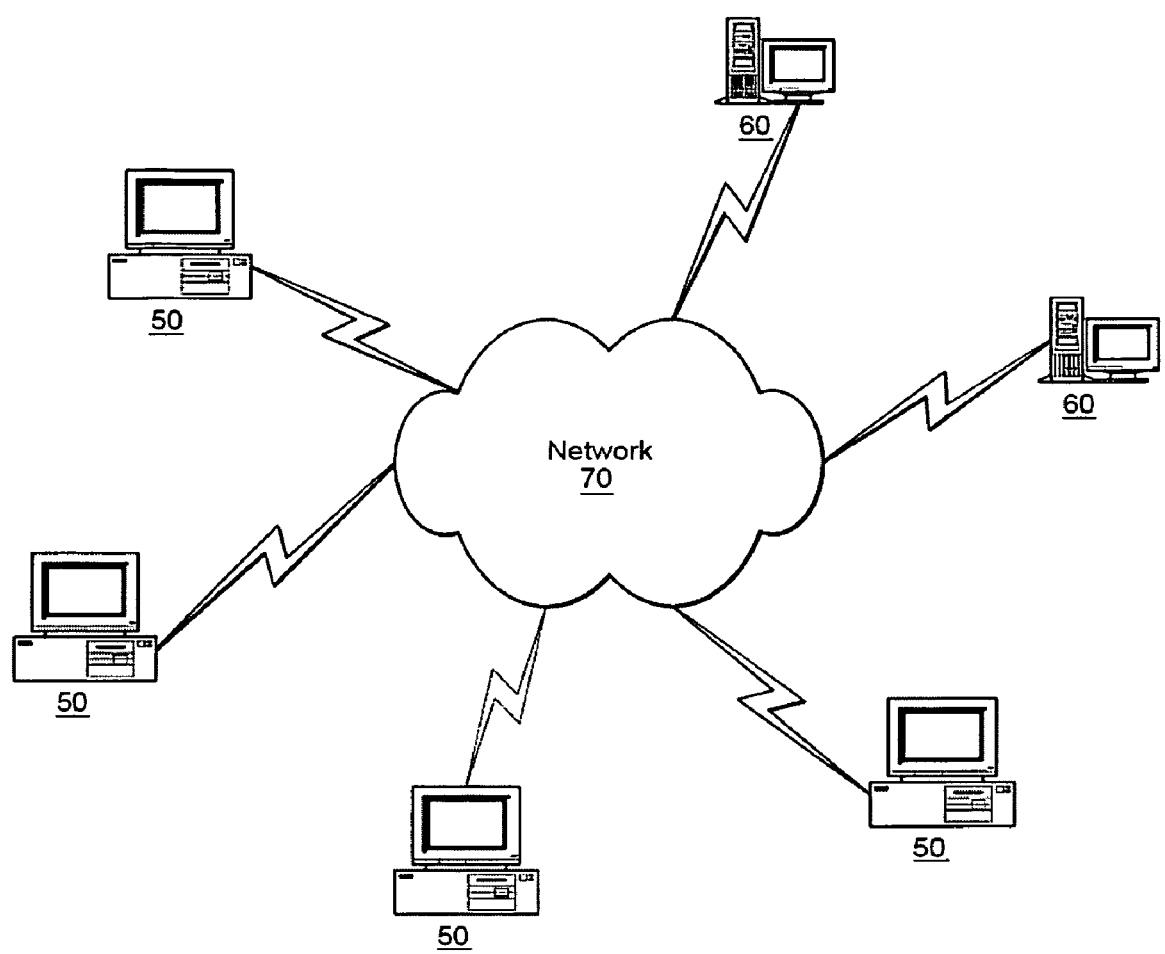
FIG. 2 illustrates a computer implementation of the present invention.

The present invention also includes computer implementation of methods to detect, verify, and repair the collinearity of a model or its subsets, such as models used for MPC-based control. FIG. 2 illustrates one embodiment of such a computer implementation. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the methods are implemented on a stand-alone computer.

Figure 3:
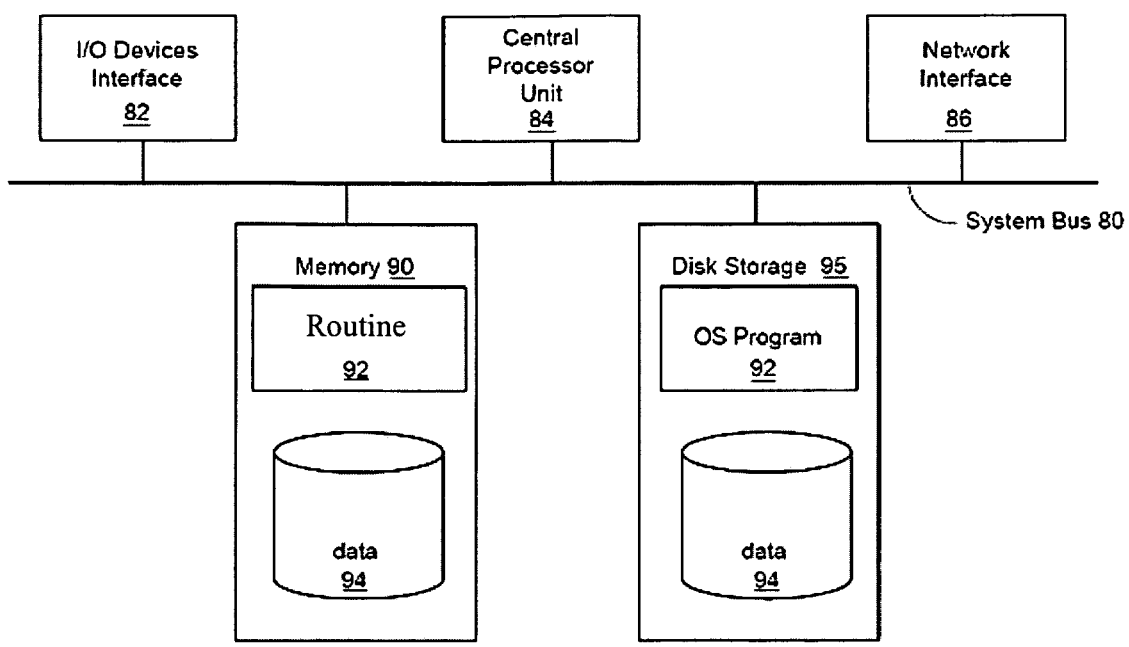
FIG. 3 is a block diagram of the internal structure of a computer in the computer system of FIG. 2.

FIG. 3 is a diagram of the internal structure of a computer (e.g., client computer(s) 50 or server computers 60) in the computer system of FIG. 2. Each computer contains system bus 80, where a bus is a set of hardware lines used for data transfer among the components of a computer. Bus 80 is essentially a shared conduit that connects different elements of a computer system (e.g., processor, disk storage, memory, input/output ports, network ports, etc.) that enables the transfer of information between the elements. Attached to system bus 80 is I/O device interface 82 for connecting various input and output devices (e.g., displays, printers, speakers, etc.) to the computer. Network interface 86 allows the computer to connect to various other devices attached to a network (e.g., network 70 of FIG. 2). Memory 90 provides volatile storage for computer software instructions used to implement an embodiment of the present invention (e.g., Program Routines 92 and Data 94, such as Process 15, DMCplus®, and corresponding MDL files). Disk storage 95 provides non-volatile storage for computer software instructions and data used to implement an embodiment of the present invention. Central processor unit 84 is also attached to system bus 80 and provides for the execution of computer instructions.

EXAMPLES

Some examples are provided here to illustrate the methodology described above. The examples are not to be interpreted as limiting in any way.

Example 1

Verifying Collinearity Using the Directional Test and Identification

Figure 4:
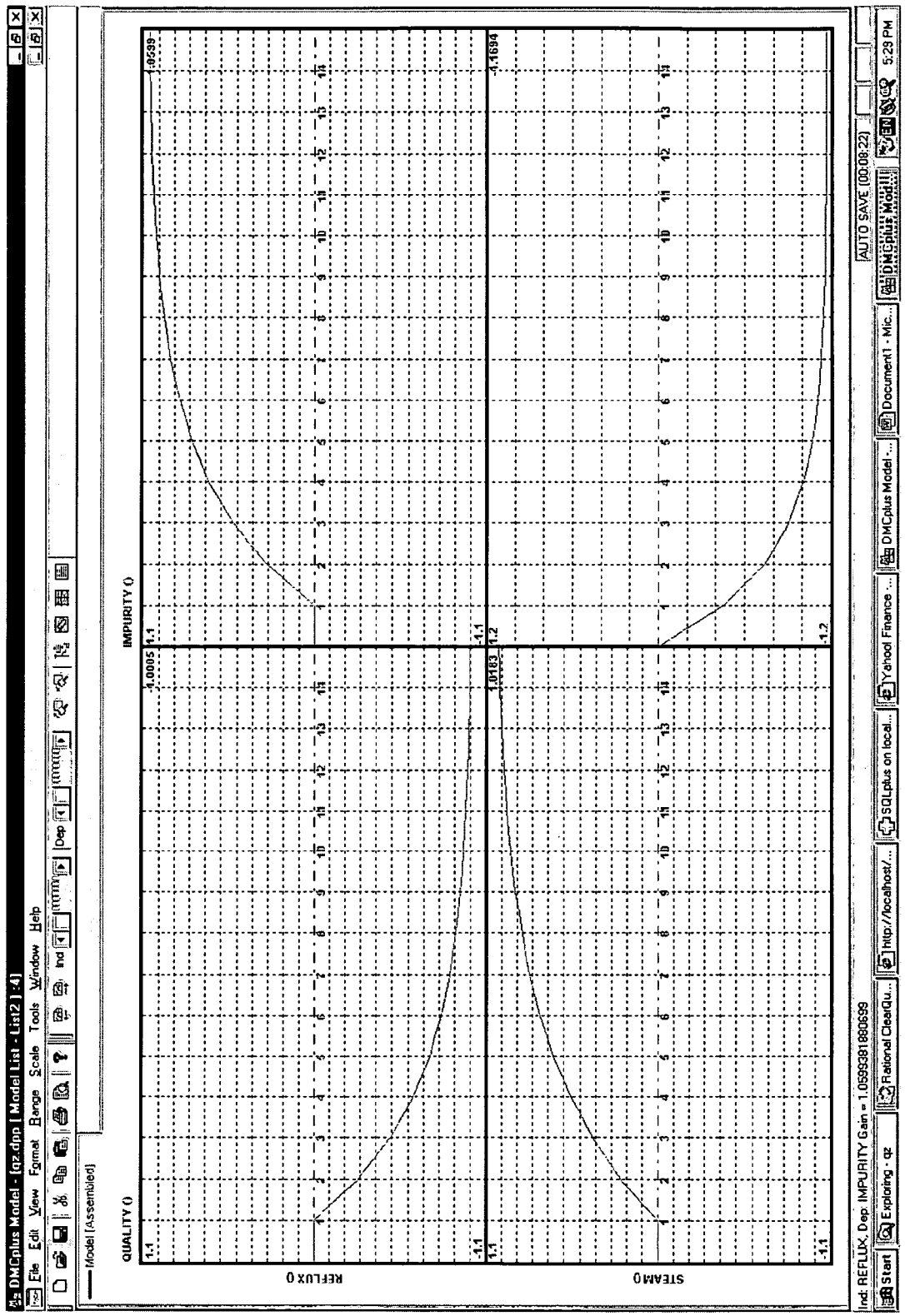
FIG. 4 is a graph illustrating linear dynamics of a simulated process.

Consider a 2×2 distillation process with the following configuration:
mv$_1$=Reflux Flow with typical operating range [7,9]
mv$_2$=Reboiler Steam with typical operating range [5,7]
cv$_1$=Top Impurity with typical operating range [6,9]
cv$_2$=Bottoms Impurity with typical operating range [3,13]
The process is simulated by linear dynamics shown in FIG. 4, which has the following gain matrix:

$$G = \begin{bmatrix} -1.0005 & 1.0599 \\ 1.0183 & -1.1694 \end{bmatrix}$$

In the simulated process, certain colored noise is added to the output signals.

Figure 5:
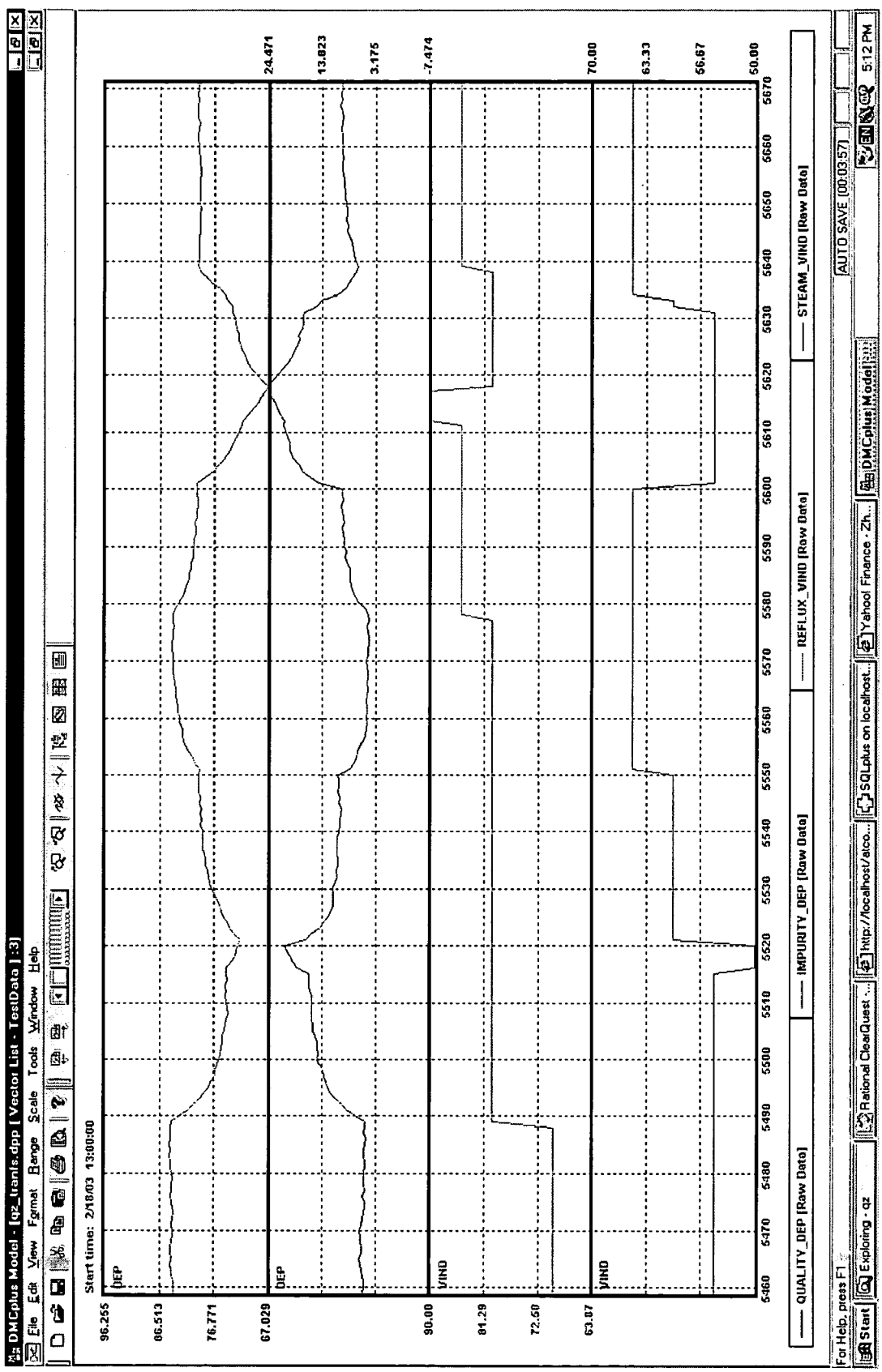
FIG. 5 is a graph illustrating test data from a regular step test.

First, a regular step test is carried out and the test data is shown in FIG. 5. A process model is then identified using DMCplus® Model 5.0 and the model has the following gain matrix:

$$G_{RT} = \begin{bmatrix} -1.0057 & 1.0710 \\ 1.0078 & -1.1564 \end{bmatrix}$$

A collinearity check on the identified gain matrix is run, and the SVD calculation shows the following result:

$$\sigma = \begin{bmatrix} 2.1236 & 0 \\ 0 & 0.0394 \end{bmatrix}$$

$$U = \begin{bmatrix} -0.6917 & 0.7222 \\ 0.7222 & 0.6917 \end{bmatrix}$$

$$V = \begin{bmatrix} 0.6703 & -0.7421 \\ -0.7421 & -0.6703 \end{bmatrix}$$

Based on the weak direction (using Equations 8 and 9 with $\alpha=-1$), to achieve a delta change in $$\begin{bmatrix} \Delta cv_1 \\ \Delta cv_2 \end{bmatrix} = \begin{bmatrix} -0.7222 \\ -0.6917 \end{bmatrix}$$

would need a control action of $$\begin{bmatrix} \Delta mv_1 \\ \Delta mv_2 \end{bmatrix} = \begin{bmatrix} 18.8349 \\ 17.0125 \end{bmatrix}$$

This control action may be too aggressive from the engineering point of view and hence the process may have collinearity issues. To verify if the real process is the case, a directional test is carried out defined by the weak direction. That is, $$\Delta mv_1/\Delta mv_2 = (-0.7421)/(-0.6703) = 1.1071$$

Figure 6:
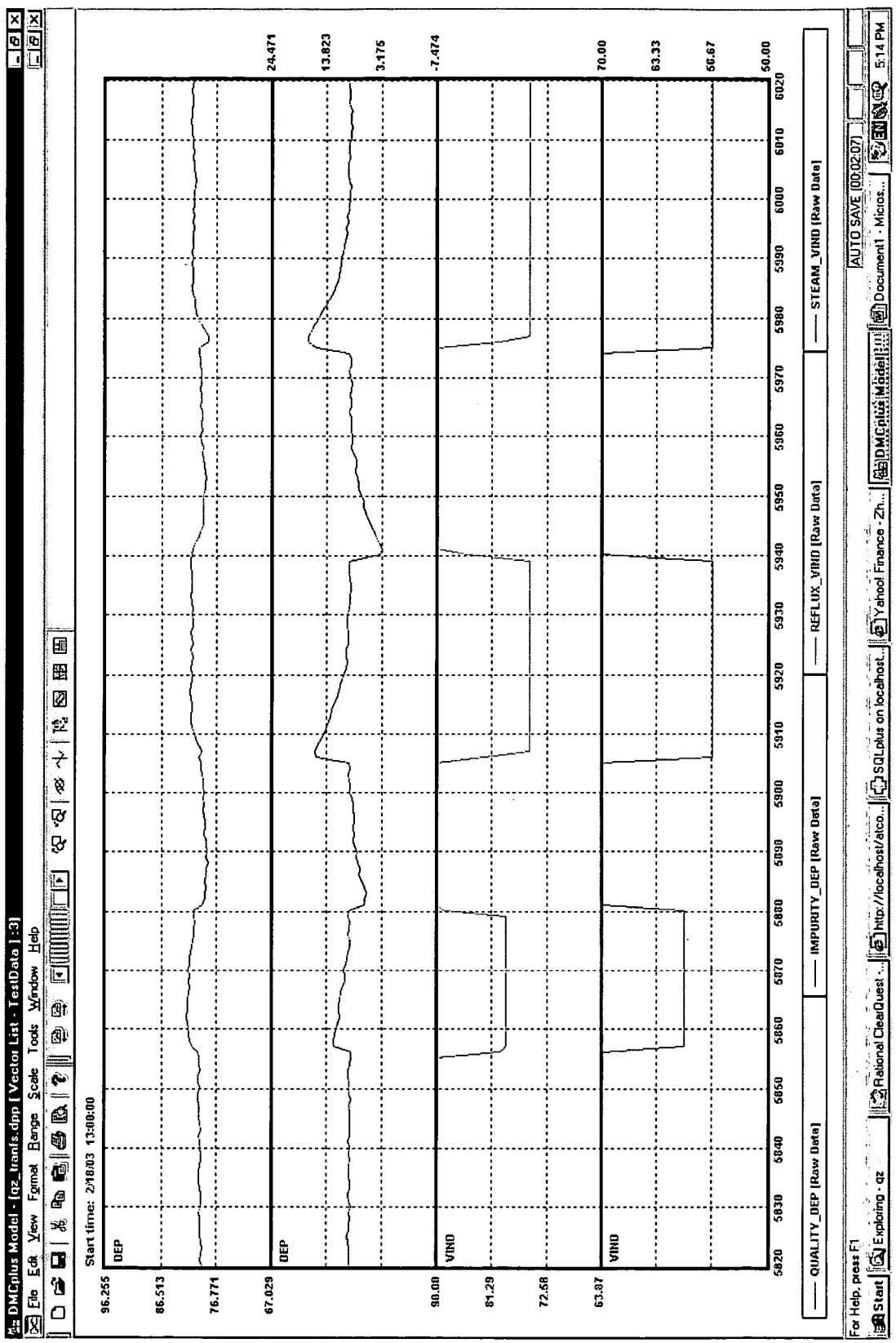
FIG. 6 is a graph illustrating test data from a directional test carried out as defined by a weak direction.

The test data is shown in FIG. 6.
The transformed input and output are:

$$mt = -0.7421*mv_1 - 0.6703*mv_2$$

$$ct = 0.7222*cv_1 + 0.6917*cv_2$$

Figure 7:
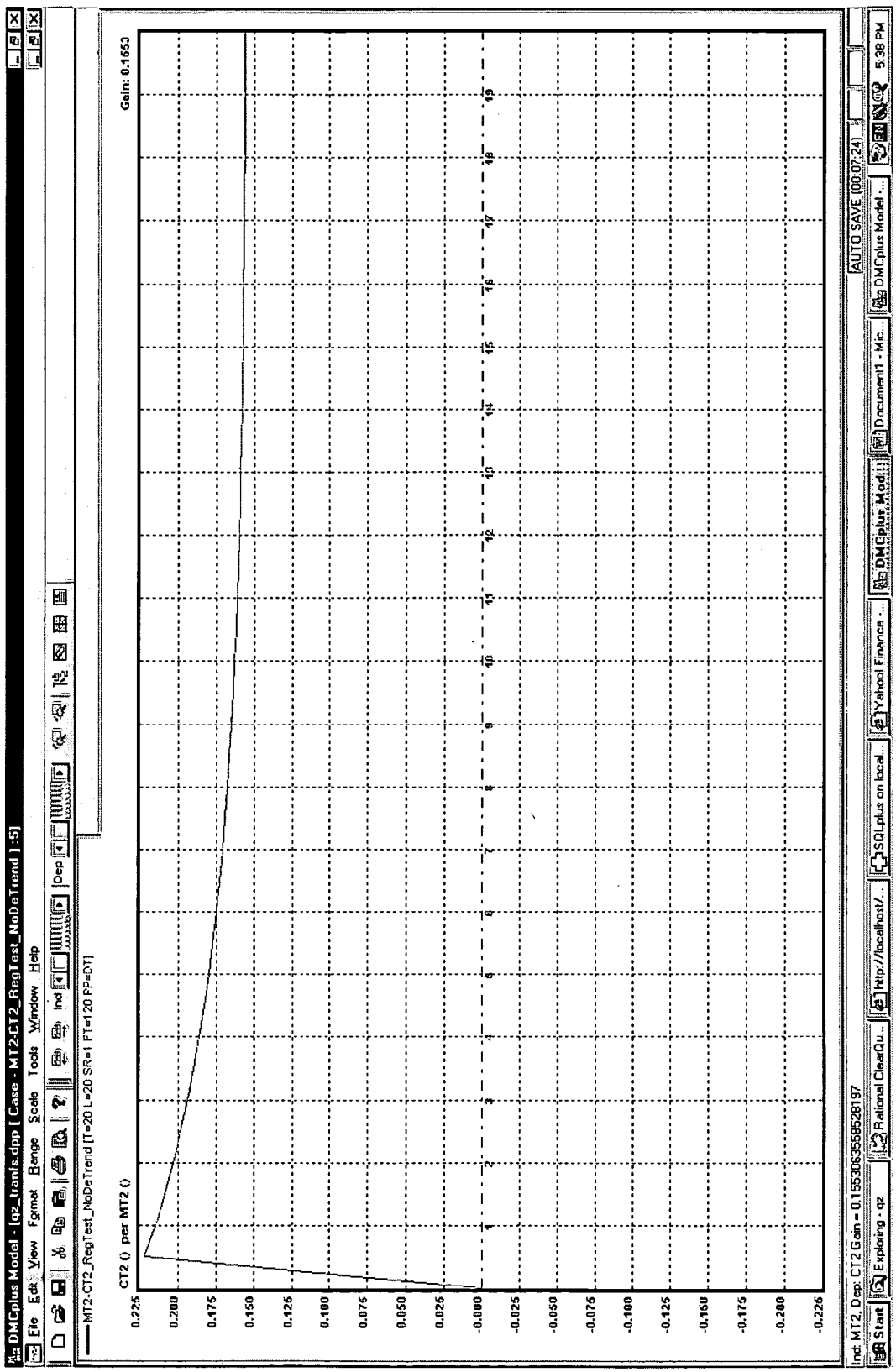
FIG. 7 illustrates a model for (mt,ct) identified using directional test data.

A model for (mt,ct) is identified using the directional test data and is shown in FIG. 7. This model has a gain of $g_D$=0.04665, which is close to the smallest singular value 0.0394. A SVD calculation on the true process model G indicates the smallest singular value for the process is 0.0426. This suggests that the estimated value from the directional test is very close to the true one. To this point, it is concluded that the analysis of collinearity based on the identified model Grt is valid.

Figure 8:
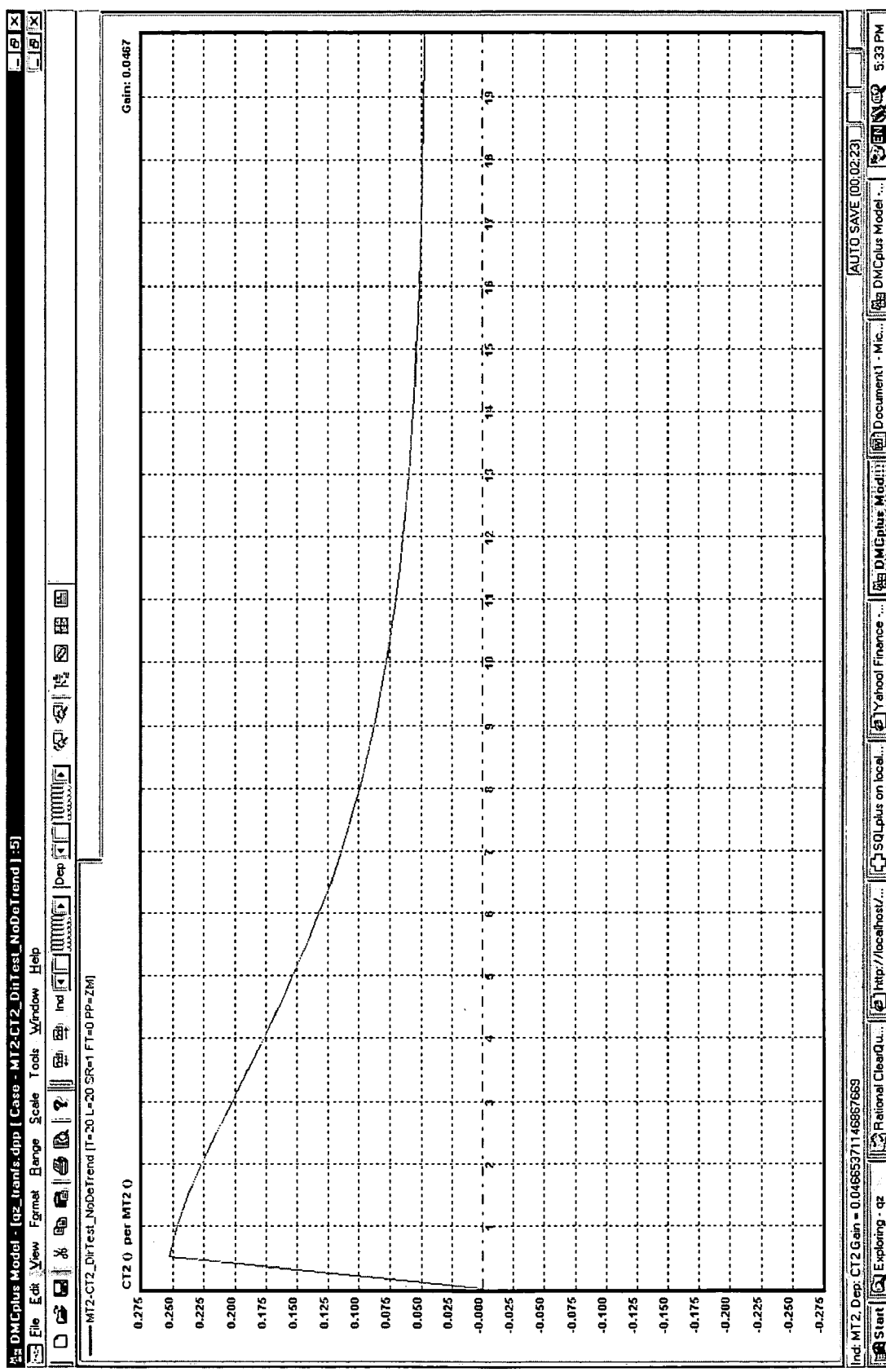
FIG. 8 illustrates a model with a gain of $g_R$=0.15531.

To illustrate the importance of directional testing to a nearly collinear process, an identification is run in the same transformed space, but with the regular test data (i.e., without the directional test). FIG. 8 illustrates the model, and it has a gain of $g_R$=0.15531. This value differs greatly from the true one.

An improved model can be identified if both data sets (obtained from the regular test and the directional test) are utilized. The new model has a gain matrix of $$G_{DT} = \begin{bmatrix} -1.0049 & 1.0661 \\ 1.0029 & -1.1675 \end{bmatrix}$$

Example 2

Collinearization or Uncollinearization Modification of a Gain Matrix To Maximize or Minimize the Condition Number Let's consider a gain matrix shown below:

$$G = \begin{bmatrix} -0.6112 & -0.8705 & -0.8161 & -2.2515 & 0 & 0 & 0 & 0 & 0 & 0 & 4.4013 & 0 \\ -2.8114 & -5.3374 & -10.1706 & -30.0073 & 1.8984 & 1.8283 & 0.1132 & 0.0153 & 0.1204 & 0.0495 & 0 & 0 \\ -2.0609 & 6.0295 & 9.4035 & 24.5094 & -1.6758 & -1.7359 & -0.154 & -0.0253 & -0.1818 & -0.0677 & 0 & 0 \\ -0.6244 & -1.4399 & -2.5429 & -7.4598 & 0.4203 & 0.4147 & 0 & 0.0091 & 0.0456 & 0.0187 & 0 & -0.2577 \\ 0.1446 & 0.3026 & 0.5424 & 1.5888 & -0.0855 & -0.0843 & 0 & -0.0016 & -0.0105 & -0.004 & 0 & 0.1572 \\ -1.7149 & -2.731 & 6.9034 & 17.5966 & -1.2014 & -1.2893 & 0 & -0.0407 & -0.1277 & -0.0382 & 0 & 0 \\ -0.0015 & -0.0034 & 0.004 & 0.0227 & 0 & -0.0016 & 0 & 0 & 0 & 0 & 0 & 0 \end{bmatrix}$$

Given a threshold of s=0.0001, the following three sub-matrices are identified to be collinear:

$$G_1 = \begin{bmatrix} 6.0295 & -1.7359 \\ -1.4399 & 0.4147 \end{bmatrix},$$

with singular values σ=(0.831627 7.57818e−5)

$$G_2 = \begin{bmatrix} -1.6758 & -0.1818 \\ -0.4203 & 0.0456 \end{bmatrix},$$

with singular values σ=(3.44311 6.69126e−5)

$$G_3 = \begin{bmatrix} -2.8114 & 1.8984 & 1.8283 & 0.0153 \\ -2.0609 & -1.6758 & -1.7359 & -0.0253 \\ -0.6244 & 0.4203 & 0.4147 & 0.0091 \\ -1.7149 & -1.2014 & -1.2893 & -0.0407 \end{bmatrix},$$

with singular values σ=(3.2117 1.89876 0.60946 3.5965e−5)

Assuming that each gain element is allowed to vary no more than 10% from its nominal value.

The Collinearization results:

$$G_1 = \begin{bmatrix} 6.0302 & -1.73614 \\ -1.44011 & 0.414617 \end{bmatrix},$$

with singular values σ=(0.831509 0)

$$G_2 = \begin{bmatrix} -1.67583 & -0.181804 \\ -0.420308 & 0.0455975 \end{bmatrix},$$

with singular values σ=(3.44302 0)

$$G_3 = \begin{bmatrix} -2.81033 & 1.89821 & 1.82815 & 0.0153128 \\ -2.0605 & -1.67583 & -1.73614 & -0.0254196 \\ -0.62416 & 0.420308 & 0.414617 & 0.00902449 \\ -1.71455 & -1.20166 & -1.28927 & -0.0405464 \end{bmatrix},$$

with singular values σ=(3.21072 1.89861 0.602891 0)

The uncollinearization result:

$$G_1 = \begin{bmatrix} 5.56824 & -1.59648 \\ -1.32195 & 0.408456 \end{bmatrix},$$

with singular values σ=(0.905079 0.0169216)

$$G_2 = \begin{bmatrix} -1.5367 & -0.1818 \\ -0.414725 & 0.0456 \end{bmatrix},$$

with singular values σ=(3.64152 0.0666536)

$$G_3 = \begin{bmatrix} -3.09168 & 1.8772 & 1.79803 & 0.01377 \\ -2.11308 & -1.5367 & -1.59648 & -0.02277 \\ -0.68684 & 0.414725 & 0.408456 & 0.00819 \\ -1.76702 & -1.09372 & -1.18305 & -0.0400757 \end{bmatrix},$$

with singular values σ=(3.23766 1.9333 0.648371 0.00239357).

What is claimed is:
1. A method of analyzing a model for Model Predictive Control, the method comprising the steps of:
   a) obtaining a model gain matrix of a subject model used for Model Predictive Control of a given process;
   b) identifying any near-collinear sub-matrices of the obtained model gain matrix;
   c) adjusting the collinearity of any identified sub-matrixes; and
   d) optimizing adjusted sub-matrixes to form a new model gain matrix for the subject model.

2. The method of claim 1, wherein the identification step includes searching the model gain matrix with SVD.

3. The method of claim 1, further including a step of estimating a control action magnitude.

4. The method of claim 1, further including a step of exciting the given process in a weak direction.

5. The method of claim 1, further including a step of verifying whether at least some portion of the given process is collinear or nearly collinear.

6. The method of claim 1, wherein the method is simultaneously applied to more than one subset of the model.

7. The method of claim 1, wherein the method is applied to a square matrix or a square matrix subset that is at least 2×2 in size.

8. The method of claim 5, wherein a Collinearization procedure is implemented if at least a portion of the process is verified as being nearly collinear.

9. The method of claim 5, wherein directionality of a subset of the model is unchanged.

10. The method of claim 5, wherein an Uncollinearization procedure is implemented if at least one portion of the process is verified as being noncollinear.

11. The method of claim 7, wherein the square matrix or square matrix subset is at least 3×3 in size.

12. The method of claim 8, wherein the smallest singular values in at least one subset of the model are set to exactly zero.

13. The method of claim 11, wherein the square matrix or square matrix subset is at least 4×4 in size.

14. The method of claim 11, wherein the square matrix or square matrix subset is at least 5×5 in size.

15. The method of claim 11, wherein the square matrix or square matrix subset is at least 6×6 in size.

16. A method of detecting, verifying, and repairing collinearity or near collinearity in a model, comprising the steps of:
   a) defining bounds for a gain matrix;
   b) specifying a collinear threshold;
   c) examining the matrix to identify all near-collinear sub-matrices;
   d) scaling at least one weak output for each near-collinear sub-matrix;
   e) adjusting a control action magnitude;
   f) determining what type of model repair would be desirable;
   g) constructing a quadratic programming problem; and
   h) solving the quadratic programming problem to generate a new model matrix.

17. The method of claim 16, further comprising the step of using an optimization formula to perfectly collinearize a selected sub-model while maintaining directionality and minimizing model deviation.

18. The method of claim 16, further comprising the step of using an optimization formula to decrease collinearity in a selected sub-model while maintaining directionality and minimizing model deviation.

19. A chemical species manufactured by a process that includes the method of claim 16.

20. The method of claim 17, wherein the optimization formula includes at least one singular value, at least one singular vector, and a model matrix.

21. The method of claim 17, wherein multiple sub-matrices are solved simultaneously.

22. The method of claim 17, wherein a linear constraint is imposed, wherein the linear constraint includes the uncertainty bound in a transformed space.

23. The method of claim 18, wherein the optimization formula includes at least one singular value, at least one singular vector, and a model matrix.

24. The method of claim 23, wherein multiple sub-matrices are solved simultaneously.

25. The method of claim 23, wherein a linear constraint is imposed, wherein the linear constraint includes the uncertainty bound in a transformed space.

26. A computer program product, comprising:
   a) a computer usable medium; and
   b) a set of computer program instructions embodied on the computer useable medium for detecting, verifying, and repairing collinearity or near collinearity in a model used for Model Predictive Control purposes, the computer program instructions including instructions to:
      define bounds for a gain matrix;
      specify a collinear threshold;
      identify any near-collinear sub-matrixes of the gain matrix;
      adjust collinearity of any identified near collinear sub-matrix; and
      optimize the adjusted sub-matrixes to form a new model gain matrix for the subject model.

27. The computer program product of claim 26, wherein at least some portion of the computer program instructions include instructions to request data or request instructions over a telecommunications network.

28. The computer program product of claim 26, wherein at least some portion of the computer program is transmitted over a global network.

29. The computer program product of claim 26, wherein the computer usable medium includes a removable storage medium.

30. The computer program product of claim 29, wherein the removable storage medium includes any of a CD-ROM, a DVD-ROM, a diskette, and a tape.

31. A computer system for detecting, verifying, and repairing collinearity or near collinearity in a model used for Model Predictive Control purposes, the computer system comprising:
   a) a data transfer means for transferring data among components of a computer;
   b) a digital processor coupled to receive input from the data transfer means, wherein the digital processor executes a method for analyzing a model used for Model Predictive Control purposes, wherein the method:
      i) detects collinearity or near collinearity in the model,
      ii) verifies the collinearity or near collinearity in the model, and
      iii) repairs the collinearity or near collinearity in the model; and
   c) an output means coupled to the digital processor, wherein the output means provides to a user the analyzed model.

32. The computer system of claim 31, wherein the computer system enables transmission of at least a portion of data over a global network.

* * * * *